United States Patent [19]

Halene et al.

[11] Patent Number: 4,458,496
[45] Date of Patent: Jul. 10, 1984

[54] METHOD FOR THE CHARGING OF PRESSURE GAS CONTAINERS FOR THE STORAGE OF HYDROGEN

[75] Inventors: Clemens Halene, Düsseldorf; Karl-Ludwig Strack, Hernen; Franz-Josef Henrichs, Verl; Ernst Lange, Muhmann, all of Fed. Rep. of Germany

[73] Assignee: Mannesmann Aktiengesellschaft, Dusseldorf, Fed. Rep. of Germany

[21] Appl. No.: 418,889

[22] Filed: Sep. 16, 1982

[30] Foreign Application Priority Data

Dec. 3, 1981 [DE] Fed. Rep. of Germany ....... 3148307

[51] Int. Cl.³ ............................................. F17C 11/00
[52] U.S. Cl. .......................................... 62/48; 34/15; 123/DIG. 12; 165/61; 165/DIG. 12; 206/0.7; 423/248
[58] Field of Search ............................ 62/48; 206/0.7; 123/DIG. 12; 34/15; 165/61, DIG. 12; 423/248

[56] References Cited

U.S. PATENT DOCUMENTS

| | | | |
|---|---|---|---|
| 4,134,490 | 1/1979 | Turillon et al. | 62/48 |
| 4,135,621 | 1/1979 | Turillon et al. | 62/48 |
| 4,196,525 | 4/1980 | Ebdon et al. | 62/48 |
| 4,270,360 | 6/1981 | Nakane et al. | 62/48 |

Primary Examiner—Ronald C. Capossela
Attorney, Agent, or Firm—Cullen, Sloman, Cantor, Grauer, Scott & Rutherford

[57] ABSTRACT

The invention relates to the charging of pressure gas containers used for the storage of hydrogen, on the basis of a gas/solid matter reaction. In the method the container (1) is supported from the outside both on filling and compressing of the storage material (2) and on subsequently charging the material (2) with hydrogen. By this means, deformations of the container wall through expansion of the storage mass or its introduction into the container are inhibited, and the use of larger more economic containers is made possible.

4 Claims, 3 Drawing Figures

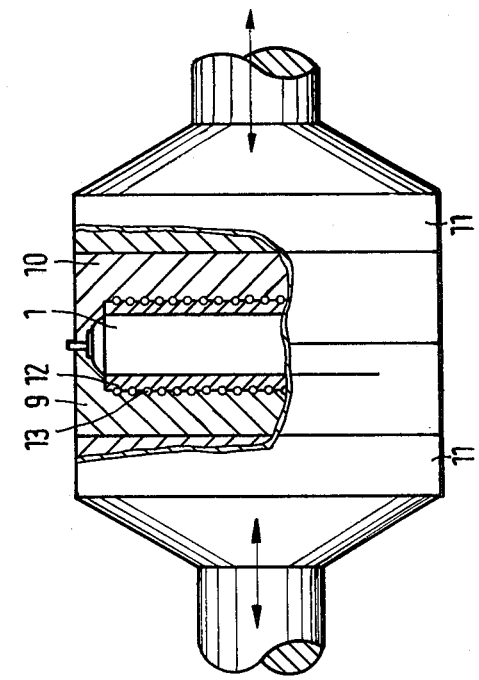
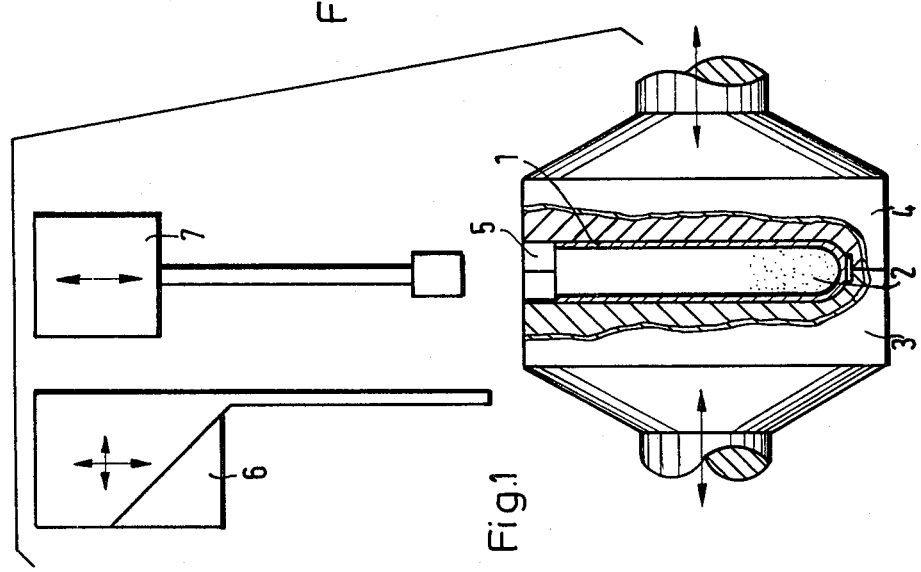

METHOD FOR THE CHARGING OF PRESSURE GAS CONTAINERS FOR THE STORAGE OF HYDROGEN

The invention relates to the charging of pressure gas containers for the storage of hydrogen on the basis of a gas/solid matter reaction.

In the known gas pressure containers, which are used for the storage of hydrogen, the hydrogen-storing metals or their alloys are introduced in pulverised form into containers. This has the disadvantage that, depending upon possible bulk densities the storage mass occupies a large volume.

A further disadvantage in known hydride storage vessel constructions is that as the active storage mass is charged with hydrogen, it expands under considerable internal pressure, with the consequence that the container walls can become unevenly deformed and opened out. This phenomenon makes itself felt all the more clearly the higher the pulverised storage mass is pre-compressed, and the larger the storage vessel selected. For this reason, gas pressure containers on the basis of gas/solid matter reactions are usually manufactured no greater than 40 mm diameter and collected together into clusters. This form of arrangement is expensive. The storage material used is commonly precompressed to pellets, usually with the addition of aluminium powder for example, in order to economize on container volume. However, this can result in the expansion in volume making itself felt to a much higher extent, so that the operating reliability is jeopardized all the more.

The present invention seeks to create a method for the charging of pressure gas containers of the type referred to above, in which large containers (over 40 mm diameter) and greater quantities of filling material can be used, without risk of the walls of the container being destroyed on charging.

To the above ends, a method according to the invention comprises filling the container with storage material and compressing same while simultaneously supporting the container from the outside; closing the container; evacuating and heating the filled container to partly activate the storage material; and charging the storage material with hydrogen while simultaneously supporting the container from the outside.

According to the invention storage mass may be introduced into the container for example in pulverised form or in the form of precompressed pellets. The first charging with hydrogen takes place with outer support or impingement of pressure on the container and hence maintaining the pre-set volume, so that the storage mass is compressed under the effect of the hydrogen. An increase in volume beyond the elastic range of container wall and auxiliary device is avoided. In this way larger container diameters can be selected without danger. Likewise, the compression favours the kinetics of the hydrogen in the practical utilisation of containers. The method according to the invention also makes it possible to dispense with metallic admixtures, which are known to be applied to support thermal processes. This can result in a space saving of the order of 5 to 10%.

The method of the invention may include a preliminary charging step in which 10 to 20% of the maximum hydrogen storage capacity is applied to the storage material in the container without external support therefor. To obtain an increased operating reliability is further proposed to undertake an interrupted initial charging with hydrogen, with the objective that a residual expansion of the powder mass without external support produces a durable prestressing in the container wall.

It is particularly advantageous to carry out the pre-compression of the pulverulent storage mass with external support, since a deformation of the container walls is already precluded thereby in the filling process. Also, the effectiveness of metallic heat conducting elements which are inserted or a coolant circuit is increased because, through the isostatic pressure build-up, a close connction of such elements or circuit with the storage mass and the container wall is made.

The invention will now be described by way of example and with reference to the accompanying diagrammatic drawing wherein:

FIG. 1 shows the filling of a container with storage material while providing external support;

FIG. 2 shows the closed container; and

FIG. 3 shows the initial charging of the container while providing external support.

As shown in FIGS. 1 to 3, a container 1, which is constructed in the form of an elongated cylindrical hollow body, is filled with storage material 2 in powder form and compressed. The pass form supporting the container wall, comprising pass halves 3 and 4 receives the container 1 in its cavity 5. A dosing device 6 (not described in detail) feeds the storage material 2 in layers. A pressing and shaking device 7 also undertakes the compression of the storage material 2 in layers. On closure of the container 1 with the cover 8 and after the carrying out of the part activation steps—evacuation and heating—the container 1 is introduced into a second pair of pass halves 9 and 10 and a compression device 11 and is held locked. In this position, the container 1 is now charged with addition of hydrogen. The elimination of heat from the storage mass 2, as is known to be necessary, takes place via the wall of the container 1, via a metal receiver 12 with good heat conducting properties (e.g. copper), and via a coolant circuit 13. The characterizing parameters such as quantity, pressure and temperature are monitored by known measuring devices.

What we claim is:

1. A method of charging a pressure gas container for the storage of hydrogen on the basis of a gas/solid matter reaction, comprising supporting the container from the outside; filling the container with storage material and compressing same; closing the container; evacuating and heating the filled container to partly activate the storage material; and charging the storage material with hydrogen while simultaneously supporting the container from the outside.

2. A method according to claim 1 wherein the storage material is introduced into the container in pulvarized form.

3. A method according to claim 1 wherein the storage material is introduced in the form of precompressed pellets.

4. A method of charging a pressure gas container for the storage of hydrogen on the basis of a gas/solid matter reaction, comprising supporting the container from the outside; filling the container with storage material and compressing same; closing the container, evacuating and heating the filled container to partly activate the storage material; charging the storage material with hydrogen 10 to 20% of the maximum hydrogen storage capacity of the container with no exterior support for the container for prestressing the container wall; supporting the container from the outside; and simultaneously charging the storage material with hydrogen to its maximum storage capacity.

* * * * *